United States Patent [19]
Koike

[11] Patent Number: 6,052,233
[45] Date of Patent: Apr. 18, 2000

[54] TAKING LENS AND CAMERA EQUIPPED WITH THE SAME

[75] Inventor: Kazumi Koike, Kanagawa, Japan

[73] Assignee: Fuji Photo Film Co., Ltd., Kanagawa, Japan

[21] Appl. No.: 09/123,479

[22] Filed: Jul. 28, 1998

[30]  Foreign Application Priority Data

Jul. 28, 1997 [JP] Japan ................................. 9-201243

[51] Int. Cl.$^7$ .................................................. G02B 3/00
[52] U.S. Cl. .......................... 359/642; 396/311; 359/718
[58] Field of Search ........................... 359/796, 718–719, 359/642; 396/311

[56]  References Cited

U.S. PATENT DOCUMENTS 5,414,560  5/1995  Kiriki ....................................... 359/654
5,701,207  12/1997  Waketa et al. ............................ 359/717

*Primary Examiner*—Scott J. Sugarman
*Assistant Examiner*—Y. Timothy Lee
*Attorney, Agent, or Firm*—Young & Thompson

[57]  ABSTRACT

A taking lens consisting of a positive power single lens element positioned behind an aperture stop of a photographic camera having an image format of 16.7×30.2 mm, and having an object side surface which includes an annular marginal section surrounding a core section defined by an effective aperture thereof. The taking lens satisfies the following conditions:

Dr<1.0

Dc<0.75

Ds<3.0 where
   Dr is the radial width of the annular margin;
   Dc is the thickness of the core section in an extension of a straight line connecting the outer periphery of the core section and the center of curvature of an image side surface of the single lens element; and
   Ds is the air space between the image side surface and the aperture stop.

9 Claims, 7 Drawing Sheets

TAKING LENS AND CAMERA EQUIPPED WITH THE SAME

BACKGROUND OF THE INVENTION

1. Field of the Invention

This invention relates to a taking lens system suitable for an inexpensive, fixed-focus camera and a photographic camera equipped with the taking lens system.

2. Description of Related Art

A considerably various types of photographic cameras for a wide variety of purposes and, in recent years, various types of lens-fitted film units which bring about easy pleasure in taking pictures have been put on the market. Such a lens-fitted film unit incorporates a roll of film contained in a cartridge which is installed in a case equipped with an exposure mechanism including a taking lens and a shutter. The lens-fitted film unit is widely spread because of the convenience that it can be gotten whenever and anywhere wishing to take pictures and is put to a photo-shop as it is after all exposures thereof. Further, the lens-fitted film unit is made with a simple structure because it has one of its great importance to be cheap and is under the necessity of being manufactured at costs as low as possible. For example, a taking lens comprising a single lens element is held in position by a lens holder formed with a fixed diameter of aperture stop and a fixed focal length standard to most objects. The film in the lens-fitted film unit is of a 35 mm type of roll film which has a picture format 24×36 mm.

Most taking lenses for these lens-fitted film units are featured by a focal length between 32 and 35 mm, an F-number of 9.5 and a half angle of view of approximately 34° and made of plastic materials, which is always desirable for manufacturing costs and production on a large scale. Because the use of plastic materials imposes a restraint on optical performance, such as a refraction power, of the taking lenses, under the condition that the taking lens has a focal length remaining constant, it is hard to make a Petzval sum dictating curvature of field of the taking lens smaller. For this reason, in order for the lens-fitted film unit to remove or significantly reduce curvature of field which is sufficiently corrected by the taking lens, a film support for supporting and guiding a film surface in the exposure position is curved according to the curvature of field.

In recent years, a new type of film cartridge or film patrone has been placed on the market. This new type of film cartridge has a feature of unwinding a film strip from a cartridge spool and sending out the film strip out of the film cartridge by turning the cartridge spool. The film strip in the film cartridge has a width of 24 mm and a picture format or image frame of 16.7×30.2 mm which is smaller than that of the conventional 35 mm type roll film. On the other hand, there have been widely spread a full-frame 35 mm type of camera and lens-fitted film unit designed and adapted to take pictures of a panoramic format of 13×36 mm as well as 35 mm full-size format pictures.

If providing prints which are the same in full format or panoramic format as prints from the conventional 35 mm format film, the prints must be enlarged at magnifications larger than conventional prints. Accordingly, a miniaturized image frame or picture format causes a demand for high optical performance of a taking lens. Further, in order for a taking lens to provide a desirable panoramic effect, the taking lens is necessary to have a wide angle of view. These lens demands are apt to make it difficult to design inexpensive taking lenses. Accordingly, in order for lens-fitted lens units containing the new format of film roll to have an angle of view and optical performance at the same level as those of two component taking lenses.

A two component taking lens needs mechanical elements such as a lens holder, a fixture ring and a light blocking member as many as the number of lens elements assembled together with the lens elements, which always makes a structure complicate and needs precise assembling work in addition to a rise in production costs.

SUMMARY OF THE INVENTION

It is accordingly an object of the invention to provide a taking lens which is produced at low costs at no sacrifice of optical performance.

It is another object of the invention to provide a taking lens suitable for use with a simple photographic device such as a fixed-focus camera and a single use lens-fitted film unit.

The foregoing objects of the invention are accomplished by providing a taking lens consisting of a positive power single lens element which has an object side surface including an annular marginal section surrounding a core section defined by an effective aperture thereof. The taking lens is positioned behind an aperture stop of a photographic camera having an image format of 16.7×30.2 mm and the positive power single lens element satisfies the following conditions:

$$Dr < 1.0$$

$$Dc < 0.75$$

$$Ds < 3.0$$

where Dr is the radial width of the annular margin; Dc is the thickness of the core section in an extension of a straight line connecting the outer periphery of the core section and the center of curvature of an image side surface of the single lens element; and Ds is the air space between the image side surface and the aperture stop.

The taking lens is most suitably used with a fixed-focus type of photographic camera, in particular such as a lens-fitted film unit, having an image format of 16.7×30.2 mm. The camera of this type incorporates a curved film support and guide plane as a focal plane concave to the image end.

The use of a single lens element for the taking lens yields a decrease in the number of parts such as a lens holder and a lens fixture necessary to install the taking lens to the camera and a reduction in transmitted loss which is contributory to high luminance at the focal plane.

The parameters set forth are necessary for suitably minimizing the size of the taking lens with an effect of preventing or significantly preventing aggravation of optical performance of the taking lens. The first parameter provides illuminance necessary for image quality. The second and third parameters yields a wide angle of view of the taking lens with an effect of balancing the aberrations of the taking lens.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 5:
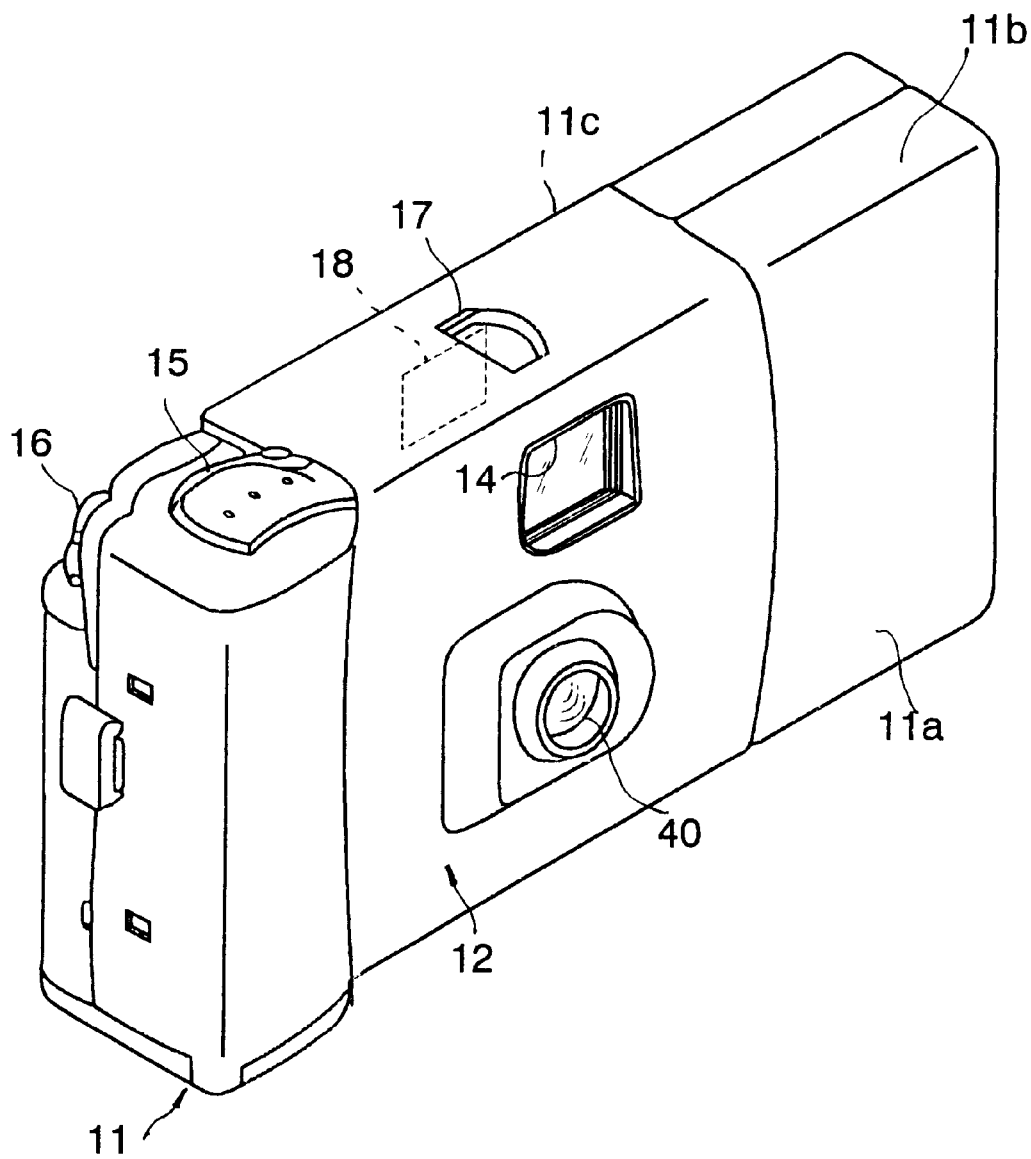
FIG. 5 is an external perspective view of a lens-fitted film unit with the taking lens of the present invention installed thereto.

Referring to the drawings in detail, in particular, to FIG. 5 showing a lens-fitted film unit 10, the film unit 10 includes a light-tight plastic unit housing 11. The unit housing 11 incorporates a taking lens 40 and a viewfinder objective window 14 in the front wall 11a, a shutter button 15, a film advance knob 16 and a film counter opening 17 in the top wall 11b, and a viewfinder eyepiece window 18 in the back wall 11c. The label band 12 printed with an ornamental illustration and partly covering the unit housing 11 is formed with openings through which the taking lens 40, the viewfinder objective window 14, the frame counter window 17 and the viewfinder eyepiece window 18 arc exposed. There is not any necessity to remove the label band 12 before taking pictures.

Figure 6:
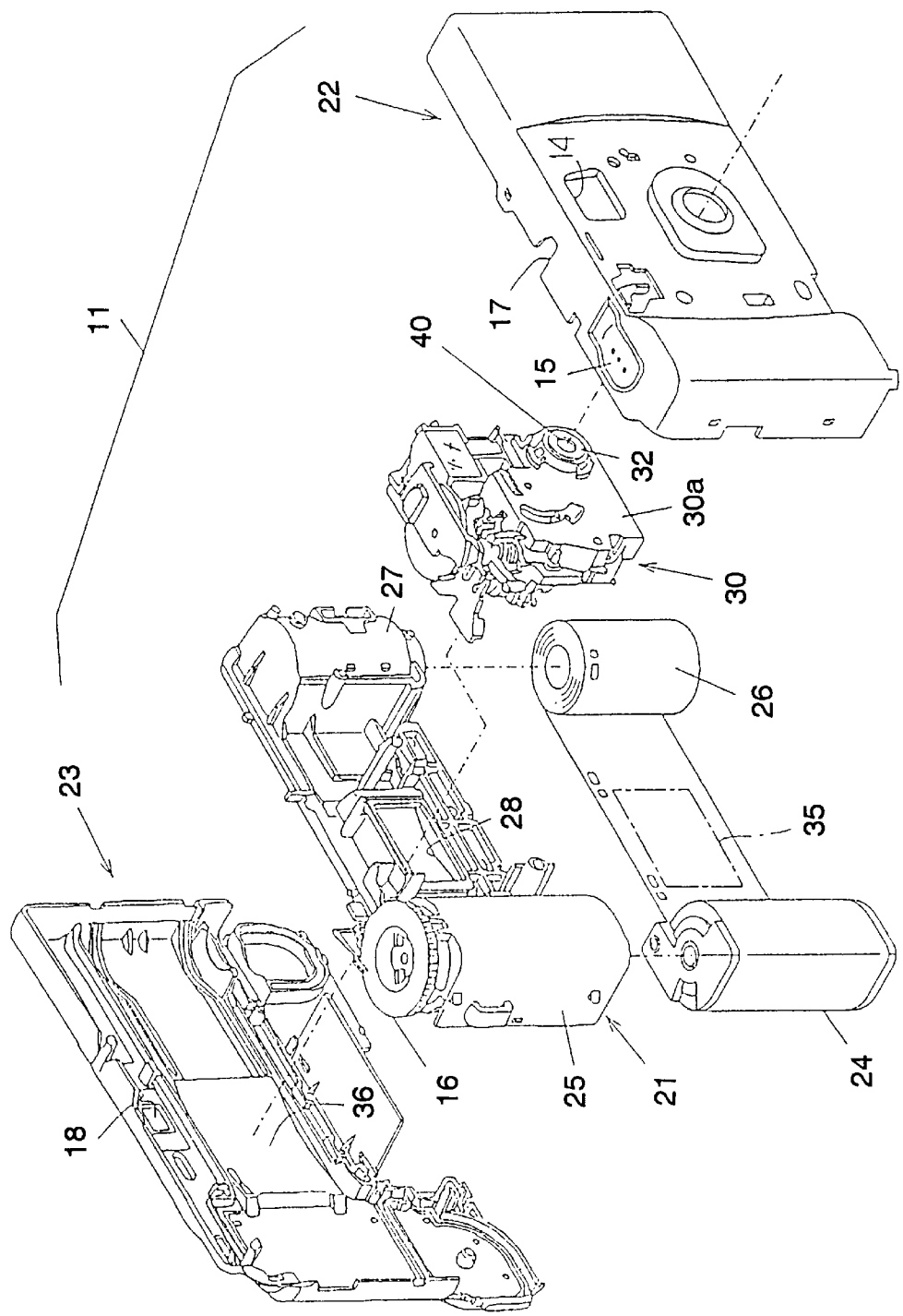
FIG. 6 is an exploded perspective view of the lens-fitted film unit of FIG. 5.
Figure 7:
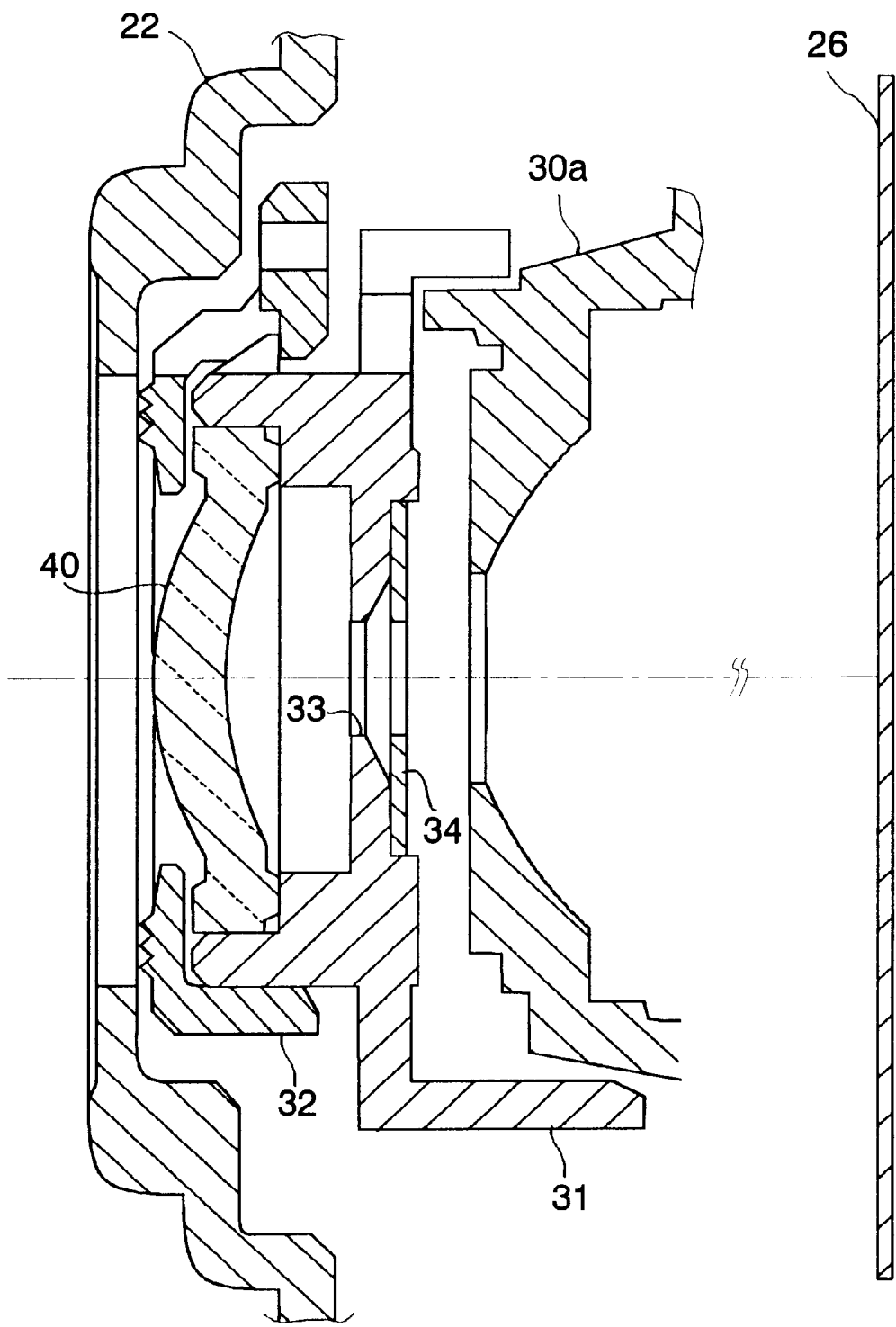
FIG. 7 is a schematic cross-sectional view of an essential section of the lens-fitted film unit of FIG. 5.

As shown in detail in FIG. 6, the unit housing 11 is comprised of a main body section 21 and front and rear cover sections 22 and 23 mated with the main body section 22 from front and back, respectively. These three sections 21–23 are assembled as one whole so as keep the interior light tight. The main body section 21 at its opposite sides is provided with a cartridge chamber 25 in which a film cartridge 24 is received and a film roll chamber 27 into which a film strip 26 is rolled in. The main body section 21 is further formed with an exposure aperture frame 28 between the cartridge and film roll chambers 25 and 27. An exposure unit 30 is attached to the exposure aperture frame 28 from the front. The exposure unit 30 includes at least the taking lens 40, a shutter mechanism and a film metering mechanism assembled to a base structure 30a. As seen in FIG. 7, the taking lens 40 is supported by a lens holder 31 forming part of the base structure 30a and fixed to the lens holder 31 by a fixture ring 32. The lens holder 31 is formed with a circular opening as an aperture stop 33 and provided on an image side with a light blocking plate 34 formed with a circular opening to block marginal light.

Referring back to FIG. 6, the film strip 26 is previously received in a roll in the film roll chamber 27 and secured at one of its ends to a cartridge spool (not shown). An exposed frame is rewound into the film cartridge 24 and rolled on the cartridge spool by turning the film advance knob 16 after every exposure. The film strip 26 is of a type having a width of 24 mm and an image frame 35 or picture format of 16.7×30.2 mm which is defined by the exposure aperture frame 28. The rear cover section 23 is formed with a curved film support and guide surface 36 as a focal plane which is concave to the image end and positioned behind the exposure aperture frame 28. The film strip 26 is supported on the concave surface 26 and placed in position behind the exposure aperture frame 28.

Figure 1:
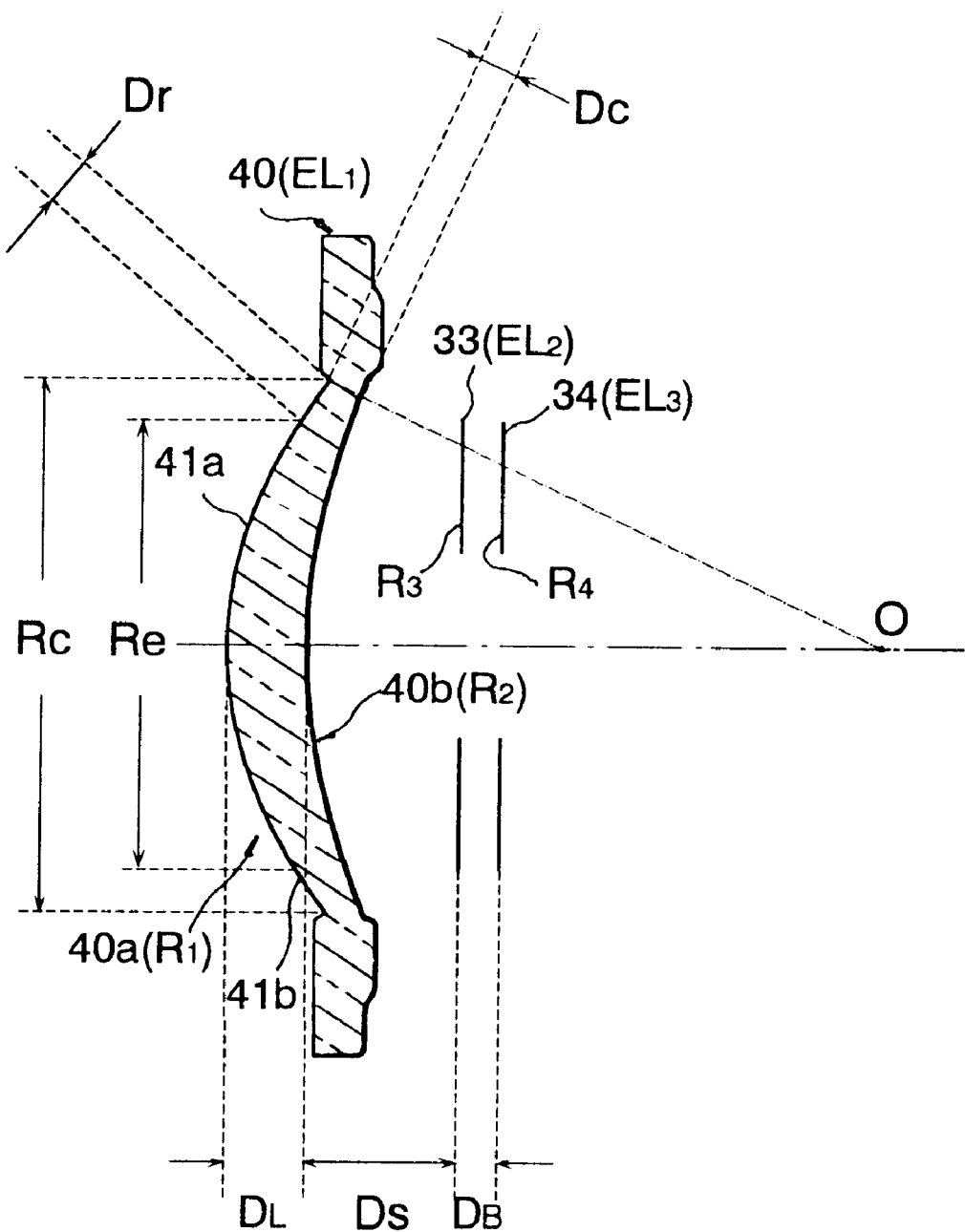
FIG. 1 is a schematic side view of a taking lens in accordance with an embodiment of the invention.

FIG. 1 is a schematic side view of the taking lens 40 comprising a positive power single lens element. The taking lens 40 has an object side surface 40a convex to the object end and an image side surface 40b concave to the image side. The object side surface 40a consists of a core section 41a of an outer diameter Rc including an annular marginal section 41b defined by an effective aperture Re. Letting Dr, Dc and Ds be a radial width of the annular margin 41b, a thickness of the core section 41a in an extension of a straight line connecting the outer periphery of the core section 41a and the center O of curvature of the image side surface 40b, and an air space between the image side surface 40b and the aperture stop 33, respectively, the taking lens 40 is designed and adapted to have mechanical dimensions satisfying the following conditions:

Dr<1.0

Dc<0.75

Ds<3.0

Further, the taking lens 40 is designed and adapted to have a half angle of view ω between 30° and 42° which is suitable to provide the image frame of 16.7×30.2 mm of the film strip 26.

In the following tables, various embodiments of the invention arc set forth with parameters of the invention. In the following prescription tables, the reference radius numbers R are radii of the progressive lens surface or surface of a related element. N is the index of refraction of the lens element. ʋ is the dispersion of the lens element as measured by the Abbe number. The space DL, DS, DB is an axial distance or the axial air space between adjacent surfaces. Re is the effective aperture.

A taking lens scaled to a focal length of 24 mm, an F-number (FNO) of 9.5, a half angle of view (ω) of 40° for use with a camera having a curved film support and guide surface which is concave to the image end and has a radius (RF) of 80 mm is substantially described in Table I.

TABLE I

| Element | Radius of Curvature (mm) | Axial Distance of Air Space (mm) | N | ν | Re/2 (mm) |
|---|---|---|---|---|---|
| EL1 | R₁ = 5.00 | | | | 3.26 |
| | | D_L = 1.23 | 1.492 | 57.5 | |
| | R₂ = 7.947 | | | | 2.84 |
| | | D_S = 2.26 | | | |
| EL2 | R₃ = ∞ | | | | 1.045 |
| | | D_B = 0.6 | | | |
| EL3 | R₄ = ∞ | | | | 1.05 |

| Mechanical Dimensions | | | | |
|---|---|---|---|---|
| Re (mm) | Rc (mm) | Dr (mm) | Dc (mm) | Ds (mm) |
| 6.52 | 7.22 | 0.48 | 0.50 | 2.26 |

Figure 2C:
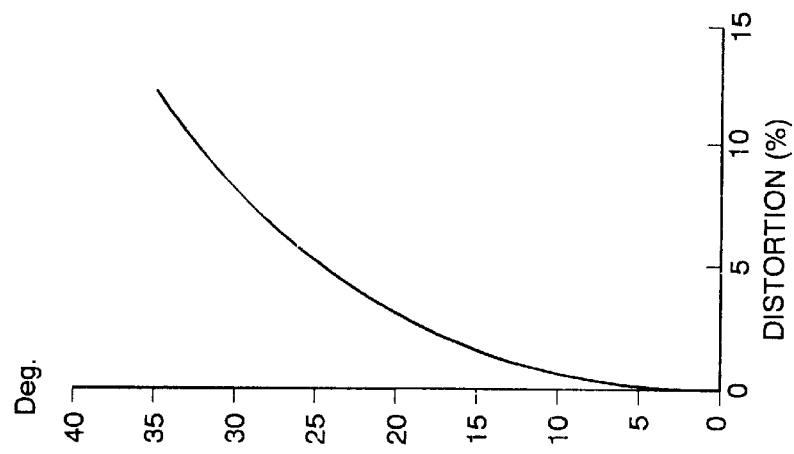
FIGS. 2A, 2B and 2C are diagrams showing spherical aberration, astigmatism in a sagittal and tangential planes, and distortion, respectively, of the taking lens shown FIG. 1.
Figure 2B:
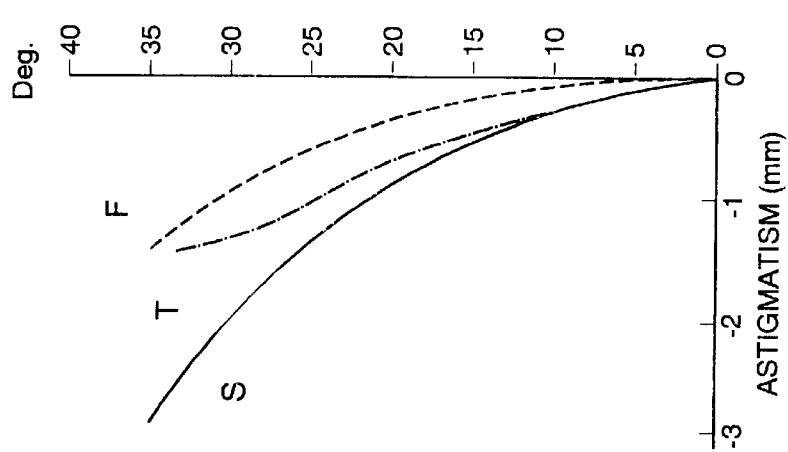
Figure 2A:
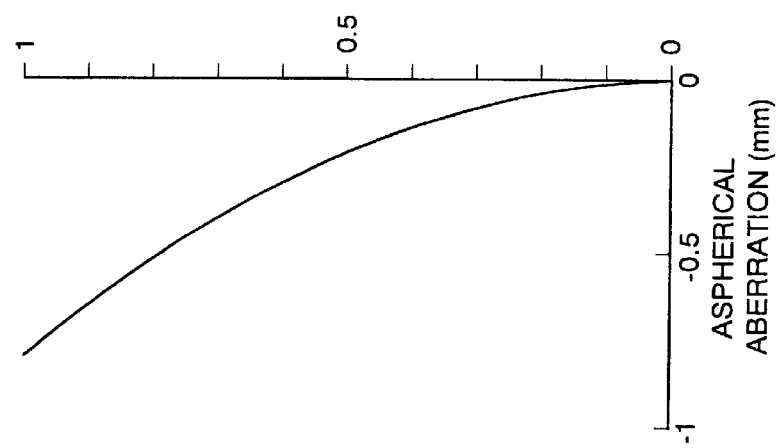

FIGS. 2A, 2B and 2C show spherical aberration, astigmatism in sagittal (S) and tangential (T) surfaces, and distortion of the lens element, respectively. In FIG. 2A, Y-axis shows the distance of incidence which is indicated by a value of 1 for an F-number of 9.5. FIG. 2B shows, for reference, field curvature F relative to a spherical surface having a radius of curvature which is equivalent to a curvature of a curved image surface of a radius of 80 mm measured in a diagonal direction.

Strictly speaking, since the image surface of the film strip 26 supported on the curved film support and guide surface 36 is curved in the lengthwise direction and the sagittal and tangential surfaces have different radii of curvature consequently, it is hard to show astigmatism in sagittal and tangential surfaces simply and precisely on the same diagram. For this reason, the astigmatism in sagittal and tangential surfaces are shown in FIG. 2B assuming that the image surface of the film strip 26 in the exposure position is flat. FIG. 2B shows, for reference, field curvature F relative to a spherical surface having a radius of curvature which is equivalent to a curvature of a curved image surface of a radius of 80 mm measured in a diagonal direction.

A taking lens scaled to a focal length of 26.5 mm, an F-number (FNO) of 10.5, a half angle of view (ω) of 35° for use with a camera having a curved film support and guide surface which is concave to the image end and has a radius (RF) of 80 mm is substantially described in Table II.

TABLE II

| Element | Radius of Curvature (mm) | Axial Distance or Air Space (mm) | N | ν | Re/2 (mm) |
|---|---|---|---|---|---|
| EL1 | $R_1$ = 5.472 | | | | 3.37 |
| | | $D_L$ = 1.12 | 1.492 | 57.5 | |
| | $R_2$ = 8.765 | | | | 3.03 |
| | | $D_S$ = 2.77 | | | |
| EL2 | $R_3$ = ∞ | | | | 1.047 |
| | | $D_B$ = 0.8 | | | |
| EL3 | $R_4$ = ∞ | | | | 1.23 |

| Mechanical Dimensions | | | | |
|---|---|---|---|---|
| Re (mm) | Rc (mm) | Dr (mm) | Dc (mm) | Ds (mm) |
| 6.74 | 7.54 | 0.526 | 0.424 | 2.77 |

Figure 3C:
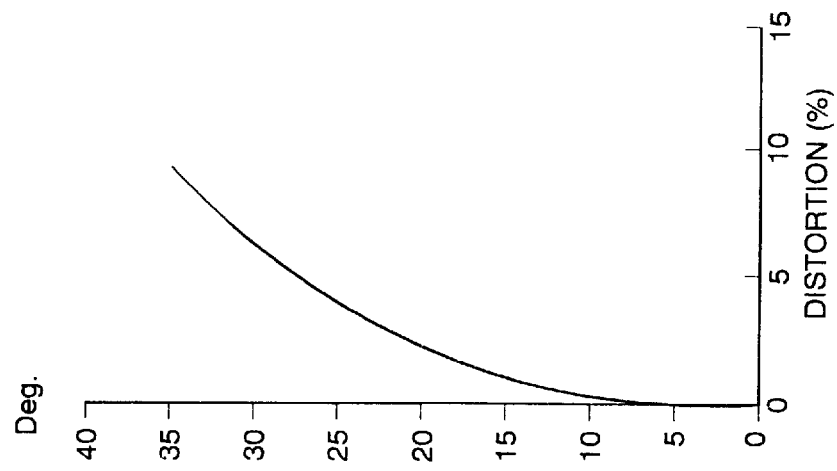
FIGS. 3A, 3B and 3C are diagrams showing spherical aberration, astigmatism in a sagittal and tangential planes, and distortion, respectively, of a taking lens shown in accordance with another embodiment of the invention.
Figure 3B:
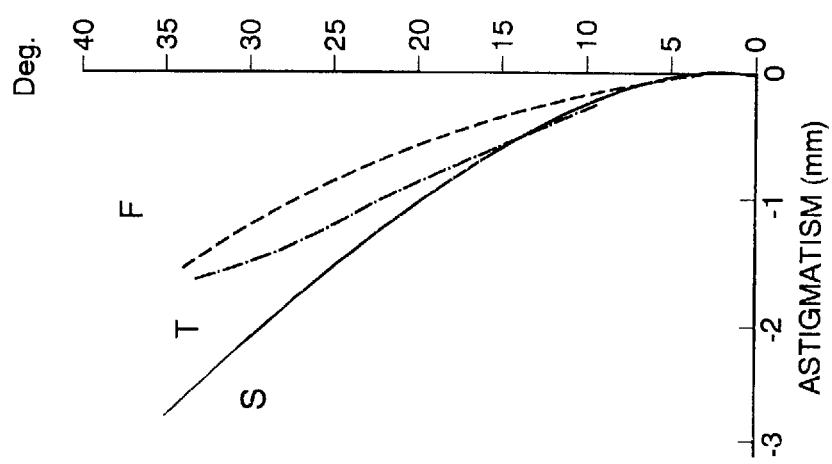
Figure 3A:
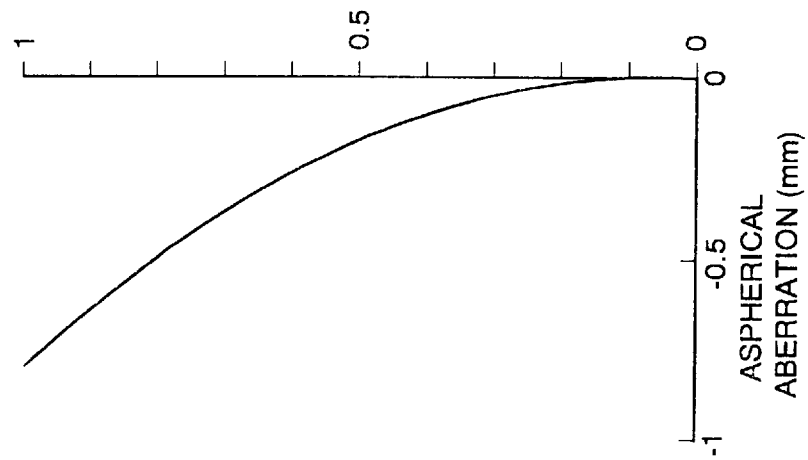

FIGS. 3A, 3B and 3C show spherical aberration, astigmatism in sagittal (S) and tangential (T) surfaces, and distortion of the lens element, respectively. In FIG. 3A, Y-axis shows the distance of incidence which is indicated by a value of 1 for an F-number of 10.5. FIG. 3B shows, for reference, field curvature F relative to a spherical surface having a radius of curvature which is equivalent to a curvature of a curved image surface of a radius of 80 mm measured in a diagonal direction.

A taking lens scaled to a focal length of 24 mm, an F-number (FNO) of 10.0, a half angle of view (ω) of 40° for use with a camera having a curved film support and guide surface which is concave to the image end and has a radius (RF) of 80 mm is substantially described in Table III.

TABLE III

| Element | Radius of Curvature (mm) | Axial Distance or Air Space (mm) | N | ν | Re/2 (mm) |
|---|---|---|---|---|---|
| EL1 | $R_1$ = 4.83 | | | | 3.08 |
| | | $D_L$ = 1.17 | 1.492 | 57.5 | |
| | $R_2$ = 7.5 | | | | 2.67 |
| | | $D_S$ = 2.12 | | | |
| EL2 | $R_3$ = ∞ | | | | 1.00 |
| | | $D_B$ = 0.6 | | | |
| EL3 | $R_4$ = ∞ | | | | 1.06 |

| Mechanical Dimensions | | | | |
|---|---|---|---|---|
| Re (mm) | Rc (mm) | Dr (mm) | Dc (mm) | Ds (mm) |
| 6.20 | 7.05 | 0.613 | 0.464 | 2.12 |

Figure 4C:
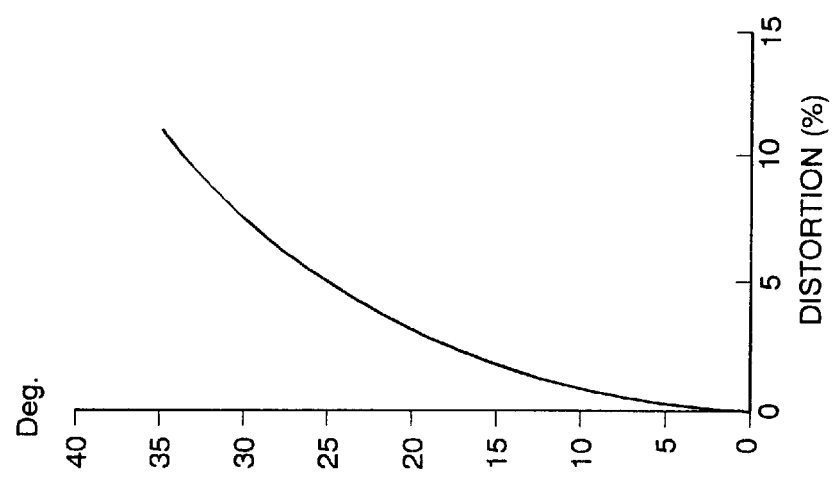
FIGS. 4A, 4B and 4C are diagrams showing spherical aberration, astigmatism in a sagittal and tangential planes, and distortion, respectively, of a taking lens shown in accordance with another embodiment of the invention.
Figure 4B:
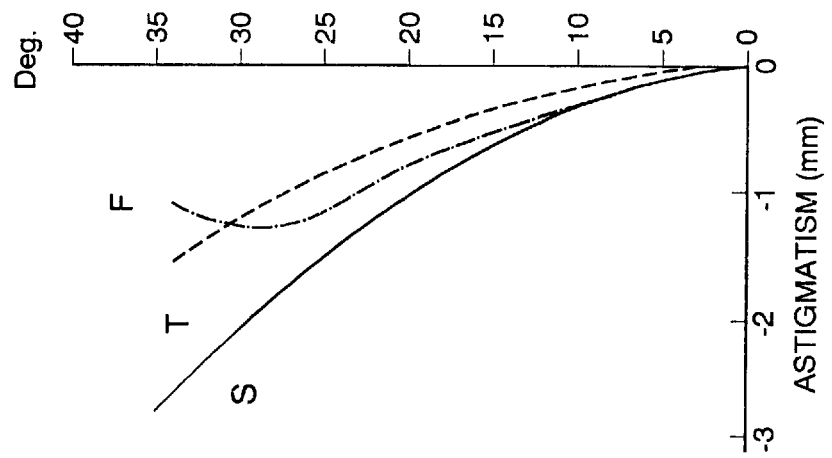
Figure 4A:
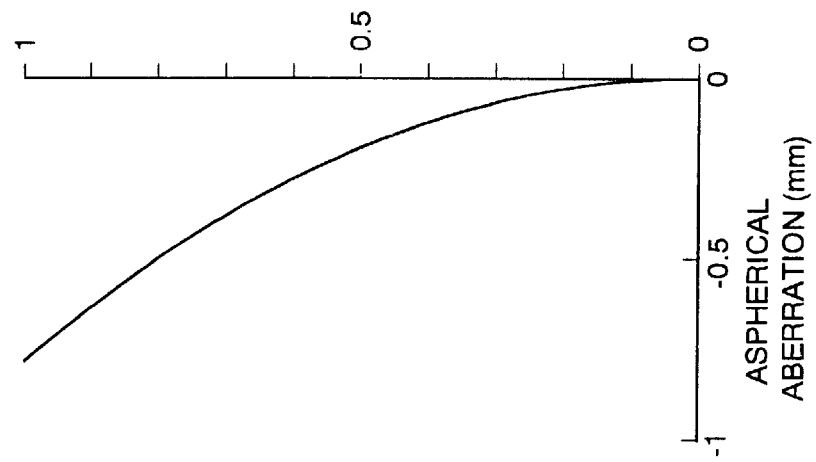

FIGS. 4A, 4B and 4C show spherical aberration, astigmatism in sagittal (S) and tangential (T) surfaces, and distortion of the lens element, respectively. In FIG. 4A, Y-axis shows the distance of incidence which is indicated by a value of 1 for an F-number of 10.0. FIG. 4B shows, for reference, field curvature F relative to a spherical surface having a radius of curvature which is equivalent to a curvature of a curved image surface of a radius of 80 mm measured in a diagonal direction.

Although the taking lens is suitably fixed in position to the lens holder by a fixture ring, because it consists of a single lens element, there is no necessity to instal the taking lens to the main body section with high accuracy. Accordingly, the front cover section may be directly attached to the lens holder with the taking lens held with faultless precision, which makes the fixture ring needless with an effect of saving cost of the lens-fitted film unit having a primary demand for a low price. The taking lens may be incorporated in fixed-focus cameras for use with a 24 mm format type of film roll. Such a fixed-focus camera is desirable to have a curved film support for supporting a film placed in an exposure position to reduce curvature of field.

As described above, the taking lens of the invention provides a wide angle of view without yielding aggravation of aberrations as well as providing high illuminance at the image surface. As compared with lens-fitted film units or cameras equipped with taking lenses consisting of two or more lens elements, lens-fitted film units or cameras equipped with the taking lens of the invention have no necessity to use lens fixture rings and light-blocking members disposed between lens elements, so that they are manufactured at reduced costs. The smallest number of lens element element used in the taking lens yields a loss of transmitted light due to surface reflection, which is always desirable to high illuminance at the image surface. In the case where such a lens-fitted film units or camera is equipped with a built-in electronic flash unit, an increase in transmittance of the taking lens is accompanied by a reduction in available quantity of light of the electronic flash unit according to the transmittance increase which is contributory to cost saving of the electronic flash unit.

It is to be understood that the present invention may be embodied with various changes, modifications and improvements, which may occur to those skilled in the art, without departing from the spirit and scope of the invention defined in the following claims.

What is claimed is:

1. A taking lens consisting of a positive power single lens element positioned behind an aperture stop of a photographic camera for use with a film having an image format of 16.7×30.2 mm, said single lens element having an object side surface, said object side surface having a core section, said core section being a full converging portion of the object side surface, an annular marginal section being a portion of the core section which lies outside an effective aperture of the single lens element, said taking lens satisfying the following conditions:

Dr<1.0

Dc<0.75

Ds<3.0

Where Dr is the radial width of the annular marginal section;
    Dc is the thickness of the core section in an extension of a straight line connecting the outer periphery of the core section and the center of curvature of an image side surface of the single lens element; and
    Ds is the air space between the image side surface and the aperture stop.

2. The taking lens as defined in claim 1 scaled to a focal length of 24 mm, An F-number of 9.5 and a half angle of view of 40° substantially as described:

| Element | Radius of Curvature (mm) | Axial Distance or Air Space (mm) | N | ν | Re/2 (mm) |
|---|---|---|---|---|---|
| EL1 | $R_1$ = 5.00 | | | | 3.26 |
| | | 1.23 | 1.492 | 57.5 | |
| | $R_2$ = 7.947 | | | | 2.84 |
| | | 2.26 | | | |
| EL2 | $R_3$ = ∞ | | | | 1.045 |

| Mechanical Dimensions | | | | |
|---|---|---|---|---|
| Re (mm) | Rc (mm) | Dr (mm) | Dc (mm) | Ds (mm) |
| 6.52 | 7.22 | 0.48 | 0.50 | 2.26 | where the single lens element EL1 has surfaces R1 and R2, the aperture stop EL2 has a surface R3, D is an axial distance or the axial air space between adjacent surfaces, N is the index of refraction of the lens element, υ is the dispersion of the lens element as measured by the Abbe number, Re is the effective aperture of the object side surface of the single lens element; and Rc is the outer diameter of the core section including the annular marginal section.

3. The taking lens as defined in claim 1 scaled to a focal length of 26.5 mm, an F-number of 10.5 and a half angle of view (ω) of 35° substantially as described:

| Element | Radius of Curvature (mm) | Axial Distance or Air Space (mm) | N | ν | Re/2 (mm) |
|---|---|---|---|---|---|
| EL1 | $R_1$ = 5.472 | | | | 3.37 |
| | | 1.12 | 1.492 | 57.5 | |
| | $R_2$ = 8.765 | | | | 3.03 |
| | | 2.77 | | | |
| EL2 | $R_3$ = ∞ | | | | 1.047 |

| Mechanical Dimensions | | | | |
|---|---|---|---|---|
| Re (mm) | Rc (mm) | Dr (mm) | Dc (mm) | Ds (mm) |
| 6.74 | 7.54 | 0.526 | 0.424 | 2.77 | where the single lens element EL1 has surfaces R1 and R2, the aperture stop EL2 has a surface R3, D is an axial distance or the axial air space between adjacent surfaces, N is the index of refraction of the lens element, υ is the dispersion of the lens element as measured by the Abbe number, Re is the effective aperture of the object side surface of the single lens element; and Rc is the outer diameter of the core section including the annular marginal section.

4. The taking lens as defined in claim 1 scaled to a focal length of 24 mm, an F-number of 10 and a half angle of view of 40° and substantially as described:

| Element | Radius of Curvature (mm) | Axial Distance or Air Space (mm) | N | ν | Re/2 (mm) |
|---|---|---|---|---|---|
| EL1 | $R_1$ = 4.83 | | | | 3.10 |
| | | $D_1$ = 1.17 | 1.492 | 57.5 | |
| | $R_2$ = 7.5 | | | | 2.67 |
| | | $D_2$ = 2.12 | | | |
| EL2 | $R_3$ = ∞ | | | | 1.00 |

| Mechanical Dimensions | | | | |
|---|---|---|---|---|
| Re (mm) | Rc (mm) | Dr (mm) | Dc (mm) | Ds (mm) |
| 6.20 | 7.05 | 0.587 | 0.464 | 2.12 | where the single lens element EL1 has surfaces R1 and R2, the aperture stop EL2 has a surface R3, D is an axial distance or the axial air space between adjacent surfaces, N is the index of refraction of the lens element, υ is the dispersion of the lens element as measured by the Abbe number, Re is the effective aperture of the object side surface of the single lens element; and Rc is the outer diameter of the core section including the annular marginal section.

5. A fixed-focus type of photographic camera for use with a film having an image format of 16.7×30.2 mm, comprising:
   an aperture stop; and
   a positive power single component taking lens positioned behind said aperture stop;
      said single lens element having an object side surface which includes an annular marginal section surrounding a core section defined by an effective aperture thereof and satisfying the following conditions:

Dr<1.0

Dc<0.75

Ds<3.0 where
   Dr is the radial width of the annular margin;
   Dc is the thickness of the core section in an extension of a straight line connecting the outer periphery of the core section and the center of curvature of an image side surface of the single lens element; and
   Ds is the air space between the image side surface and the aperture stop.

6. The fixed-focus type of photographic camera as defined in claim 5, wherein said photographic camera has a curved focal plane concave to the object end for placing a film thereon.

7. The photographic camera as defined in claim 6, wherein said curved focal plane has a radius of 80 mm and said taking lens scaled to a focal length of 24 mm, an F-number of 9.5 and a half angle of view of 40° is substantially as described:

| Element | Radius of Curvature (mm) | Axial Distance or Air Space (mm) | N | ν | Re/2 (mm) |
|---|---|---|---|---|---|
| EL1 | $R_1$ = 5.00 | | | | 3.26 |
| | | $D_1$ = 1.23 | 1.492 | 57.5 | |
| | $R_2$ = 2.26 | | | | 2.84 |
| | | $D_2$ = 2.26 | | | |
| EL2 | $R_3$ = ∞ | | | | 1.045 |

| Mechanical Dimensions | | | | |
|---|---|---|---|---|
| Re (mm) | Rc (mm) | Dr (mm) | Dc (mm) | Ds (mm) |
| 6.52 | 7.22 | 0.48 | 0.50 | 2.26 | where the single lens element EL1 has surfaces R1 and R2, the aperture stop EL2 has a surface R3, D is an axial distance or the axial air space between adjacent surfaces, N is the index of refraction of the lens element, υ is the dispersion of the lens element as measured by the Abbe number, Re is the effective aperture of the object side surface of the single lens element; and Rc is the outer diameter of the core section including the annular marginal section.

8. The photographic camera as defined in claim 6, wherein said curved focal plane has a radius of 80 mm and said taking lens scaled to a focal length of 26.5 mm, an F-number of 10.5 and a half angle of view of 35° is substantially as described:

| Element | Radius of Curvature (mm) | Axial Distance or Air Space (mm) | N | ν | Re/2 (mm) |
|---|---|---|---|---|---|
| EL1 | $R_1$ = 5.472 | | | | 3.37 |
| | | $D_1$ = 1.12 | 1.492 | 57.5 | |
| | $R_2$ = 8.765 | | | | 3.03 |
| | | $D_2$ = 2.77 | | | |
| EL2 | $R_2$ = ∞ | | | | 1.047 |

| Mechanical Dimensions | | | | |
|---|---|---|---|---|
| Re (mm) | Rc (mm) | Dr (mm) | Dc (mm) | Ds (mm) |
| 6.74 | 7.54 | 0.526 | 0.424 | 2.77 | where the single lens element EL1 has surfaces R1 and R2, the aperture stop EL2 has a surface R3, D is an axial distance or the axial air space between adjacent surfaces, N is the index of refraction of the lens element, υ is the dispersion of the lens element as measured by the Abbe number, Re is the effective aperture of the object side surface of the single lens element; and Re is the outer diameter of the core section including the annular marginal section.

9. The photographic camera as defined in claim 6, wherein said curved focal plane has a radius of 80 mm and said taking lens taking lens scaled to a focal length of 24 mm, and an F-number of 10 and a half angle of view of 40° is substantially as described:

| Element | Radius of Curvature (mm) | Axial Distance or Air Space (mm) | N | ν | Re/2 (mm) |
|---|---|---|---|---|---|
| EL1 | $R_1$ = 4.83 | | | | 3.08 |
| | | $D_1$ = 1.17 | 1.492 | 57.5 | |
| | $R_2$ = 7.5 | | | | 2.67 |
| | | $D_2$ = 2.12 | | | |
| EL2 | $R_2$ = ∞ | | | | 1.00 |

| Mechanical Dimensions | | | | |
|---|---|---|---|---|
| Re (mm) | Rc (mm) | Dr (mm) | Dc (mm) | Ds (mm) |
| 6.20 | 7.05 | 0.613 | 0.464 | 2.12 | where the single lens element EL1 has surfaces R1 and R2, the aperture stop EL2 has a surface R3, D is an axial distance or the axial air space between adjacent surfaces, N is the index of refraction of the lens element, υ is the dispersion of the lens element as measured by the Abbe number, Re is the effective aperture of the object side surface of the single lens clement; and Rc is the outer diameter of the core section including the annular marginal section.

* * * * *